United States Patent
Minoshima et al.

[11] Patent Number: 5,941,353
[45] Date of Patent: Aug. 24, 1999

[54] NON-CONTACT TYPE ELECTRIC POWER SUPPLYING SYSTEM FOR VEHICLE

[75] Inventors: Norimoto Minoshima; Yasuharu Odachi; Masaki Takasan, all of Aichi, Japan

[73] Assignee: Kabushiki Kaisha Toyoda Jidoshokki Seisakusho, Kariya, Japan

[21] Appl. No.: 08/895,191

[22] Filed: Jul. 16, 1997

[51] Int. Cl.⁶ ........................................ B60L 9/16
[52] U.S. Cl. ................................................ 191/10
[58] Field of Search ................... 191/2, 3, 10, 32

[56] References Cited

U.S. PATENT DOCUMENTS

| | | | |
|---|---|---|---|
| 5,467,718 | 11/1995 | Shibata et al. | 191/10 |
| 5,551,350 | 9/1996 | Yamada et al. | 191/10 |
| 5,709,291 | 1/1998 | Nishino et al. | 191/10 |

FOREIGN PATENT DOCUMENTS

| | | |
|---|---|---|
| 05207606 | 8/1993 | Japan . |
| 05336606 | 12/1993 | Japan . |
| 8188070 | 7/1996 | Japan . |

*Primary Examiner*—S. Joseph Morano
*Attorney, Agent, or Firm*—Morgan & Finnegan, L.L.P.

[57] ABSTRACT

A feeder is disposed along a guide rail that guides an electrically powered vehicle. The electrically powered vehicle has an electric power receiving unit that accommodates the feeder. Electric power is supplied from the feeder to the electrically powered vehicle through the electric power receiving unit on a non-contact basis. The distance between the guide rail and the feeder in a straight portion of the guide rail is different from the distance between the guide rail and the feeder in a curved portion of the guide rail.

14 Claims, 11 Drawing Sheets

NON-CONTACT TYPE ELECTRIC POWER SUPPLYING SYSTEM FOR VEHICLE

BACKGROUND OF THE INVENTION

1. Field of the Invention

The present invention relates to a non-contact electric power supplying system for supplying electric power to a vehicle on a non-contact basis.

2. Description of the Related Art

Electrically powered vehicles, such as electric train carriages and monorails, electric vehicles and vehicles that convey parts and so forth in factories, are known. As one of means for supplying electric power to such electrically powered vehicles, a charging station system has been implemented. In the charging station system, however, whenever electric power of the battery of the vehicle begins to run out, the user thereof should drive the vehicle to a charging station and charge it with electric power. Thus, when a parts conveying system in a factory is operated using such a charging system, the operation efficiency is low. Consequently, when an electrically powered vehicle travels only over a predetermined route, a more effective system is desired. To solve this problem, an electric power supplying system is used.

In the electric power supplying system, as in electric trains and monorails, a contact-type of electric power supplying system has been widely implemented. However, in this system, since the contact portions get worn, they should be maintained and periodically replaced with new ones. Moreover, in the contact-type electric power supplying system, since the contact portions are subject to sparking, such a system cannot be used in an explosion-protected area, such as an area with an oily atmosphere.

To solve such problems, non-contact type electric power supplying systems have been developed and implemented. Next, a prior art non-contact type electric power supplying system using a feeder will be described with reference to FIGS. 1 and 2.

FIG. 1 shows a conveying system that supplies electric power from a feeder on a non-contact basis. In FIG. 1, a guide rail 4 is disposed on a route of a vehicle 3 (denoted by dashed lines). A feeder 5 is disposed along the guide rail 4. The feeder 5 is a conductor wire such as a copper wire coated with an insulation material. The feeder 5 is routed from a start point X of the guide rail 4 to an end point Y thereof. AC current is supplied from an AC power supply 1 to the feeder 5. The vehicle 3 has an electric power receiving unit 2 that receives electric power from the feeder 5 on a non-contact basis. With the electric power received by the electric power receiving unit 2, the vehicle 3 travels from the start point X to the end point Y of the guide rail 4.

FIG. 2 is a partial sectional view showing the conveying system shown in FIG. 1. FIG. 2 shows principal portions including the electric power receiving unit 2 and the feeder 5 for explaining an electric power supplying method according to a related art reference.

The guide rail 4 has a guide portion 6 that guides the vehicle 3. In addition, the electric power receiving unit 2 has guide rollers 7 that clamp the guide portion 6 of the guide rail 4 from both sides. When the vehicle 3 travels, the guide rollers 7 rotate. In other words, the vehicle 3 travels along the guide rail 4. Here, the distance between the vehicle 3 and the guide rail 4 is constant.

The guide rail 4 has an outbound portion and an inbound portion of the feeder 5. The feeder 5 is held by support members 10 secured to the guide rail 4. In other words, the feeder 5 is disposed at a distance from the guide rail 4 by the support member 10. As shown in FIG. 1, the feeder 5 supplies current from the AC power supply 1 so that the current is returned at the end point Y. In FIG. 2, the directions of the currents that flow in the outbound portion and the inbound portion of the feeder 5 are always opposite to each other.

The electric power receiving unit 2 has an E-shaped magnetic material core 8. The E-shaped magnetic material core 8 is made of, for example, silicon steel or ferrite and formed in the shape of the letter E. The E-shaped magnetic material core 8 has a secondary coil 9 on the center support portion thereof.

When the vehicle 3 is placed on the guide rail 4, the outbound portion and the inbound portion of the feeder 5 are disposed in respective groove portions of the E-shaped magnetic material core 8. In this state, when an AC current is supplied to the feeder 5, the AC current causes an alternating magnetic field to be generated. The alternating magnetic field penetrates the E-shaped magnetic material core 8. Thus, due to the electromagnetic induction, the alternating magnetic field causes the secondary coil 9 to generate electromotive force. Electric power generated in the secondary coil is supplied to the vehicle 3. When the vehicle 3 travels, the electric power causes the guide rollers 7 to be rotated in a predetermined direction. Alternatively, the electric power causes tires (not shown) of the vehicle 3 to be rotated. In such a manner, the electric power is supplied from the feeder 5 to the vehicle 3 on a non-contact basis.

To allow the electric power receiving unit 2 to effectively receive electric power from the feeder 5, it is important to optimize the relative position between the feeder 5 and the E-shaped magnetic material core 8. In other words, as shown in FIG. 3A, when the distance between the feeder 5 and the E-shaped magnetic material core 8 is a predetermined value, the electric power receiving unit 2 can effectively receive electric power from the feeder 5. Thus, when the feeder 5 is too close to or far from the E-shaped magnetic material core 8, the electric power receiving unit 2 cannot effectively receive electric power.

The guide rail 4 that guides the vehicle 3 is not always straight along all of a route. Normally, the route of the guide rail 4 includes a curved portion. In addition, the E-shaped magnetic material core 8 has a length dimension in the traveling direction of the vehicle 3 (namely, the direction along the guide rail 4 or the direction perpendicular to the plane of the drawing of FIG. 3A). Thus, when the vehicle 3 travels on a curved portion of the guide rail 4, as shown in FIG. 3B, and if the relative position between the feeder 5 and the E-shaped magnetic material core 8 is optimized at the center portion of the E-shaped magnetic material core 8 in the direction along the guide rail 4, the relative position between the feeder 5 and the E-shaped magnetic material core 8 becomes improper at the end portions of the E-shaped magnetic material core 8 in the direction along the guide rail 4. Thus, the leakage flux increases, and the electric power receiving unit 2 cannot satisfactorily receive electric power. Consequently, the traveling speed of the vehicle 3 decreases or the traveling operation thereof becomes unstable.

SUMMARY OF THE INVENTION

An object of the present invention is to provide a structure for a system that supplies electric power to a vehicle that travels along a rail, the structure preventing the electric power supplying efficiency from being decreased at a curved portion of the rail.

A non-contact type electric power supplying system of the present invention is based on a structure that has a feeder disposed along a rail that guides an electrically powered vehicle and supplies electric power from the feeder to the electrically powered vehicle on a non-contact basis. The distance between a straight portion of the rail and the feeder is different from the distance between a curved portion of the rail and the feeder.

When an AC current is supplied to the feeder, an alternating magnetic field is generated. The electrically powered vehicle has an electric power receiving unit that generates electromotive force corresponding to the variations in the magnetic field. The electric power supplying efficiency varies based on the relative position between the electric power receiving unit and the feeder. The electric power receiving unit has a predetermined length in the direction along the rail. Thus, assuming that the distance between the rail and the feeder is always constant, when the vehicle travels around a curved portion of the rail, the relative position between the electric power receiving unit and the feeder becomes improper at the end portions of the electric power receiving unit. Thus, the electric power supplying efficiency decreases. According to the present invention, when the vehicle travels around a curved portion of the rail, the distance between the rail and the feeder is adjusted so that the relative position between the electric power receiving unit and the feeder is optimized. Thus, the electric power supplying efficiency is improved.

These and other objects, features and advantages of the present invention will become more apparent in light of the following detailed description of a best mode embodiment thereof, as illustrated in the accompanying drawings.

DESCRIPTION OF PREFERRED EMBODIMENT

Next, with reference to the accompanying drawings, an embodiment of the present invention will be described.

Figure 1:
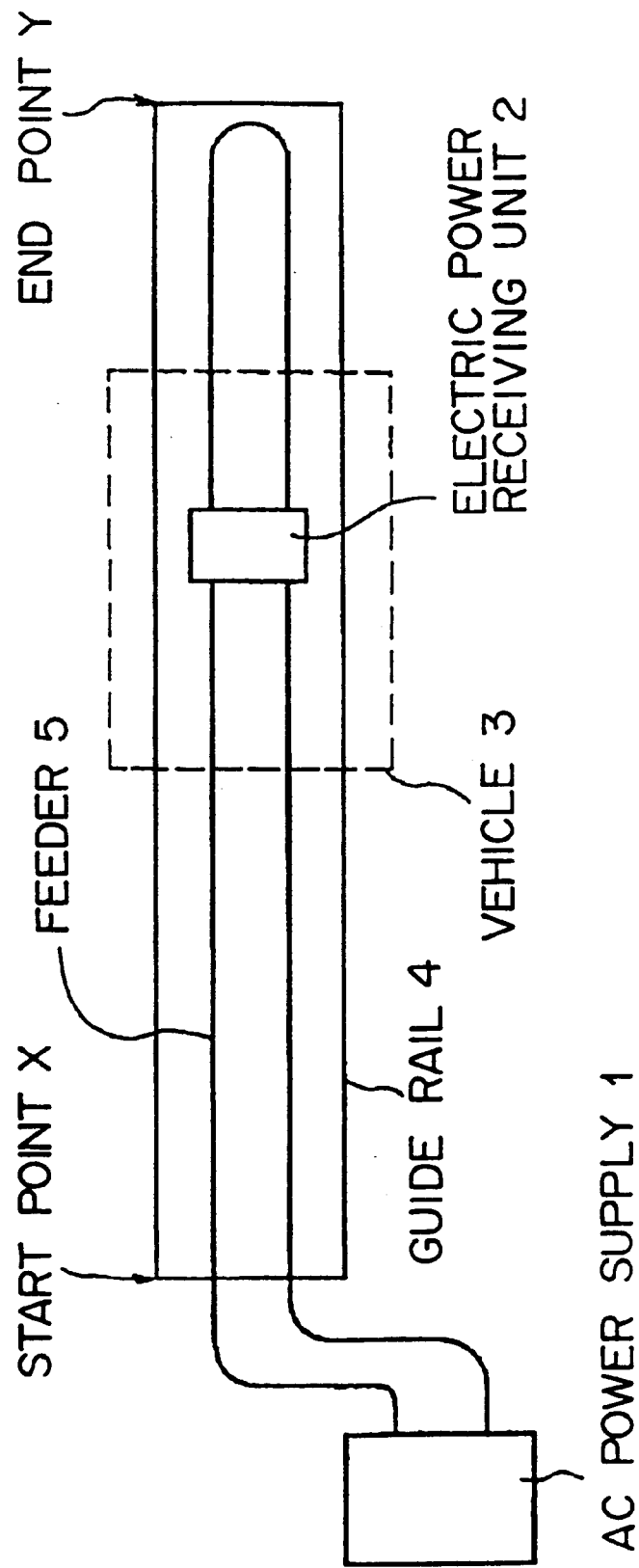
FIG. 1 is a prior art schematic diagram showing a conveying system for receiving electric power from a feeder on a non-contact basis according to a related art reference.
Figure 2:
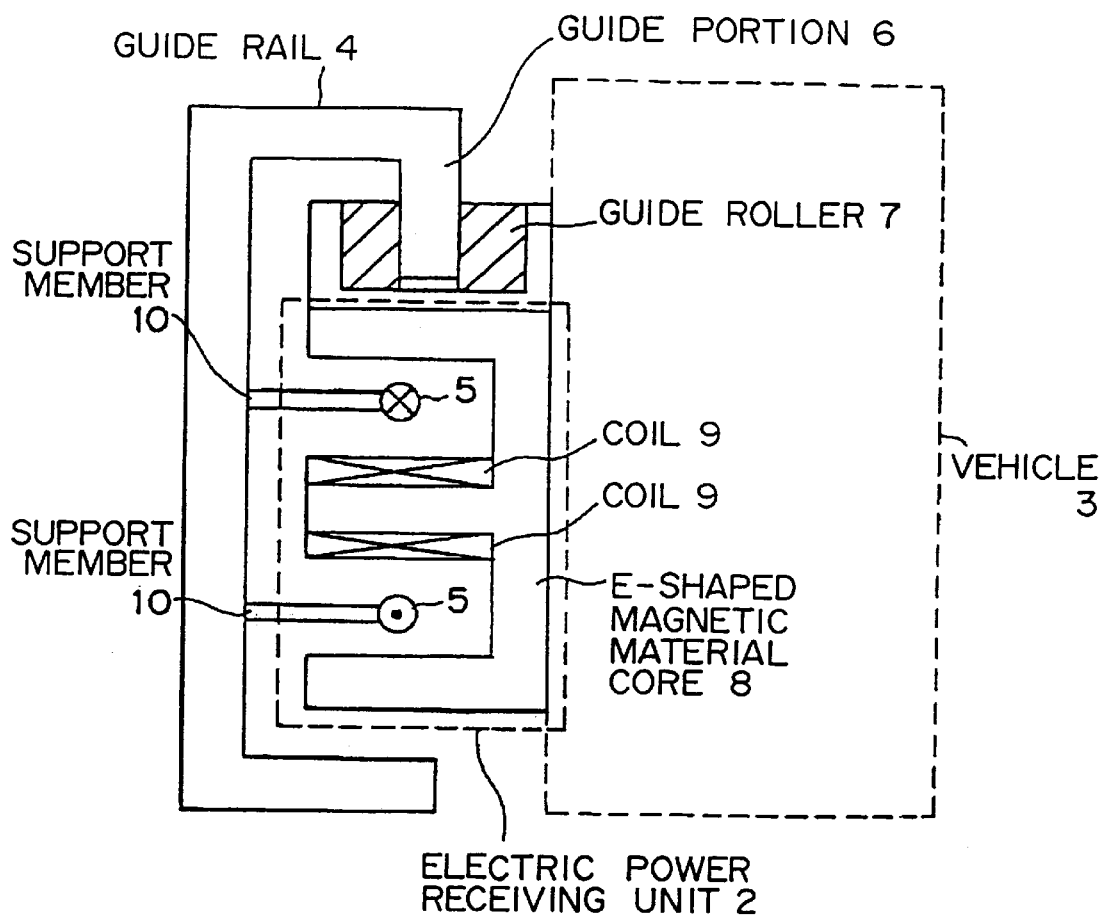
FIG. 2 is a partial sectional view showing principal portions of a prior art electric power receiving unit and a feeder of the conveying system shown in FIG. 1 for explaining an electric power supplying method.
Figure 4:
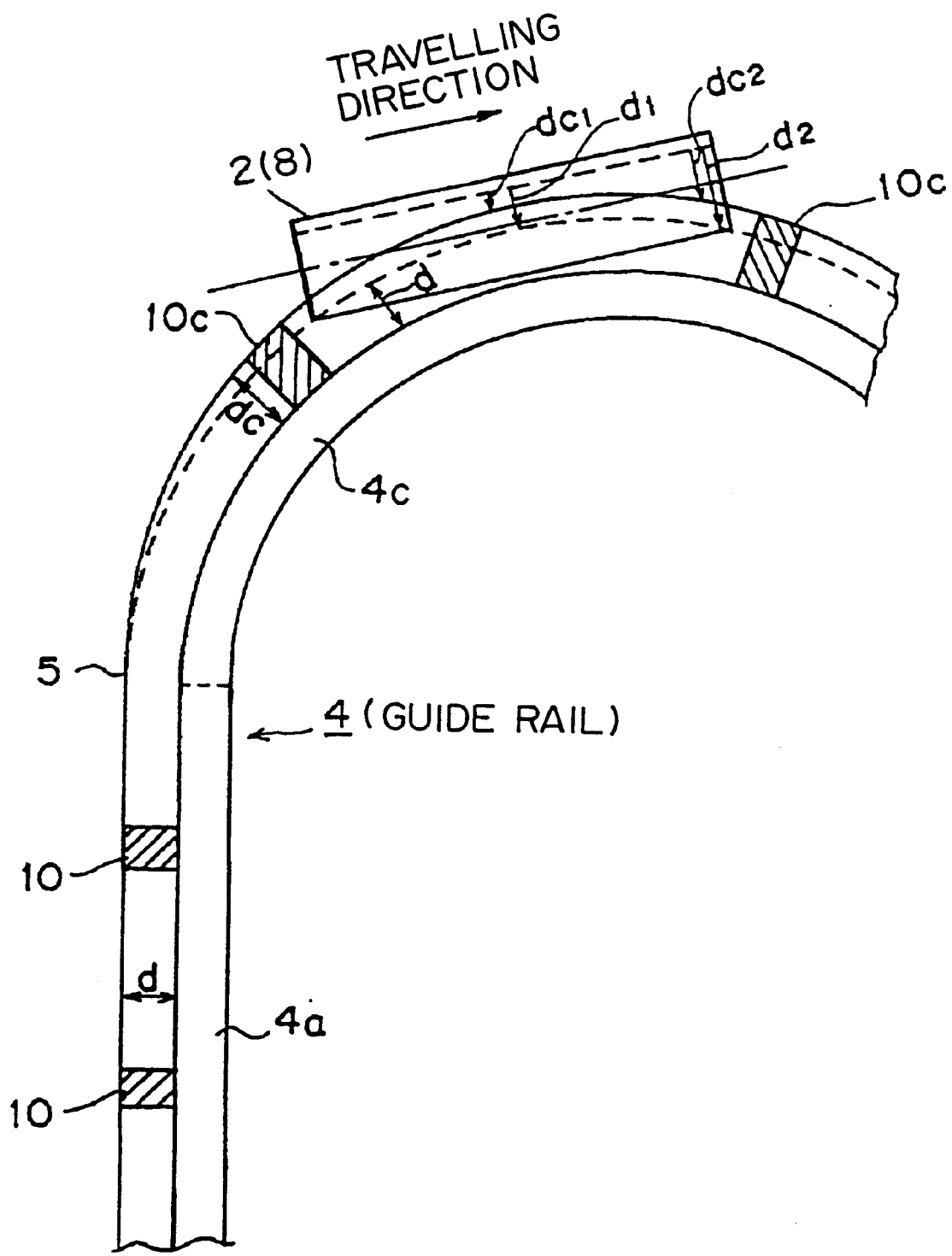
FIG. 4 is a plan view showing principal portions of a non-contact type electric power supplying system according to the present invention.

FIG. 4 is a top view showing a non-contact type electric power supplying system according to the present invention. For simplicity, in FIG. 4, only an electric power receiving unit 2 (or an E-shaped magnetic material core 8) as a vehicle that travels along a guide rail is schematically shown. Since the structure of the electric power receiving unit 2 is basically the same as that shown in FIG. 2, the description thereof is omitted.

In FIG. 4, the guide rail 4 includes a straight portion 4a and a curved portion 4c. The feeder 5 (composed of an outbound portion and an inbound portion) is disposed along the guide rail 4. The position of the feeder 5 disposed at the straight portion 4a of the guide rail 4 according to the present invention is the same as that according to the conventional structure. However, the position of the feeder 5 disposed at the curved position 4c of the guide rail 4 according to the present invention is different from that according to the conventional structure. In FIG. 4, the position of the feeder 5 according to the present embodiment is denoted by a solid line. In contrast, the position of the feeder 5 according to the conventional structure is denoted by a dashed line. In other words, according to the conventional structure, the feeder 5 is always disposed at a position a distance d away from the guide rail 4. In contrast, according to the present invention, the distance between the feeder 5 and the guide rail 4 at the curved portion 4c depends on the curvature and the curved direction.

The feeder 5 is supported by support members 10 at the straight portion 4a of the guide rail 4. The lengths of all support members 10 are equal. In other words, the feeder 5 is always held at a position a distance d away from the guide rail 4 at the straight portion 4a.

In contrast, the feeder 5 is held by support members 10c at the curved portion 4c. The lengths of the support members 10c depend on the curvature and the curved direction (outside curve or inside curve) of the guide rail 4. In other words, the distance dc between the feeder 5 and the guide rail 4 depends on the shape of the guide rail 4 at the curved portion 4c.

Figure 3A:
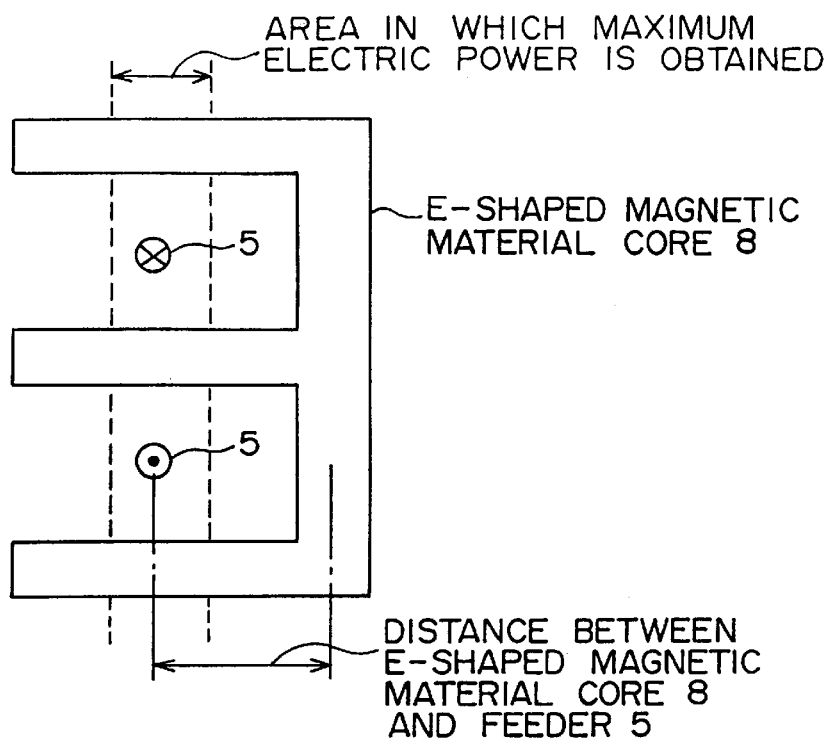
FIG. 3A shows a relative position between a feeder and a ferrite core.
Figure 3B:
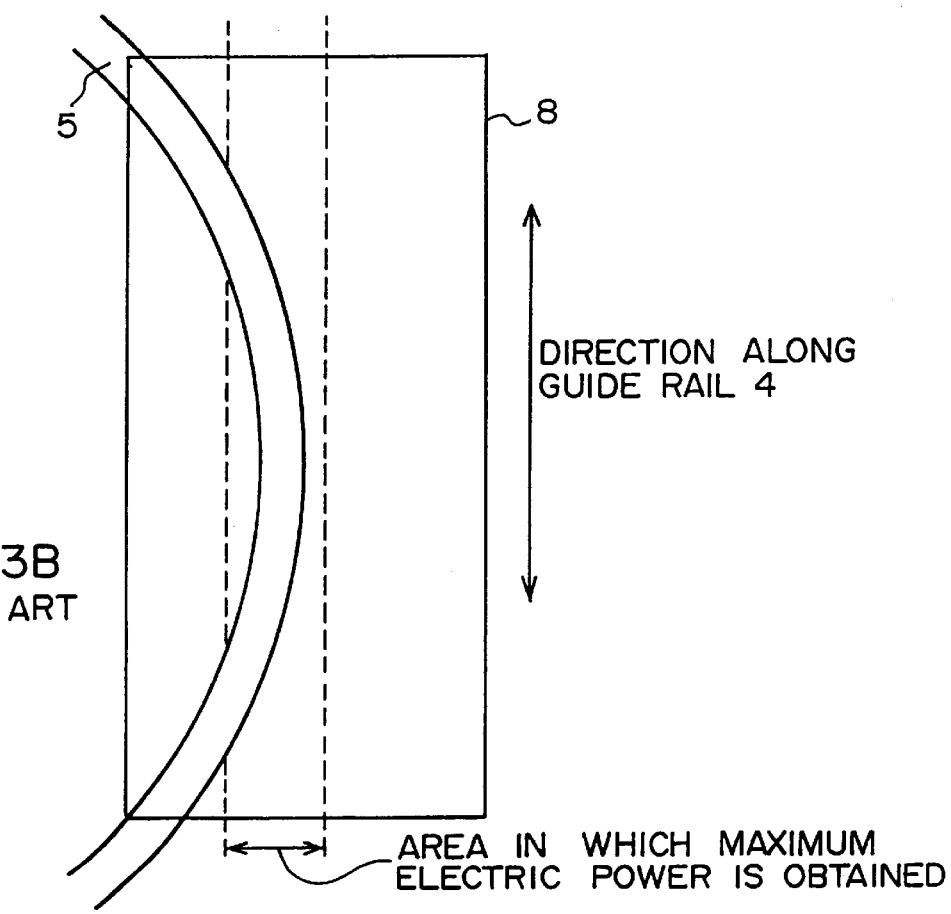
FIG. 3B is a schematic diagram for explaining a problem on a curved portion of a rail.
Figure 5A:
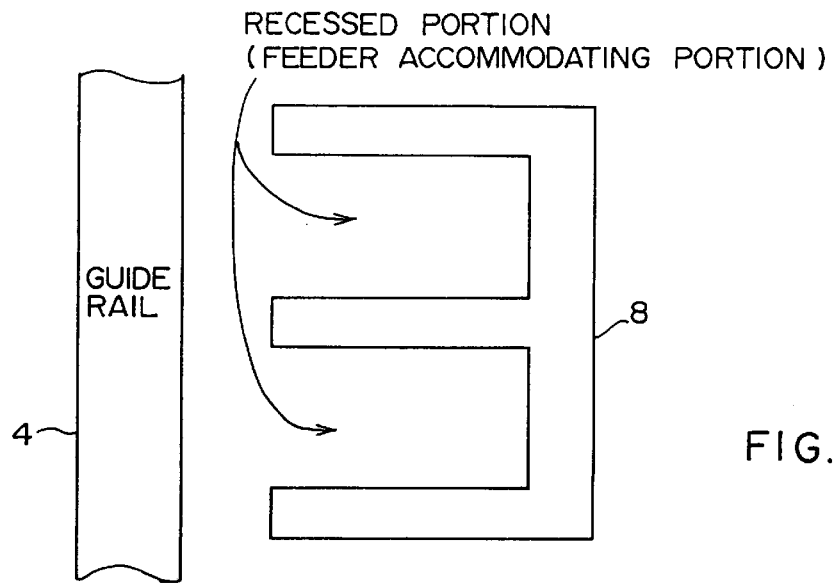
FIGS. 5A and 5B are schematic diagrams showing the relative position between the feeder and the ferrite core at a curved portion of a rail.
Figure 5B:
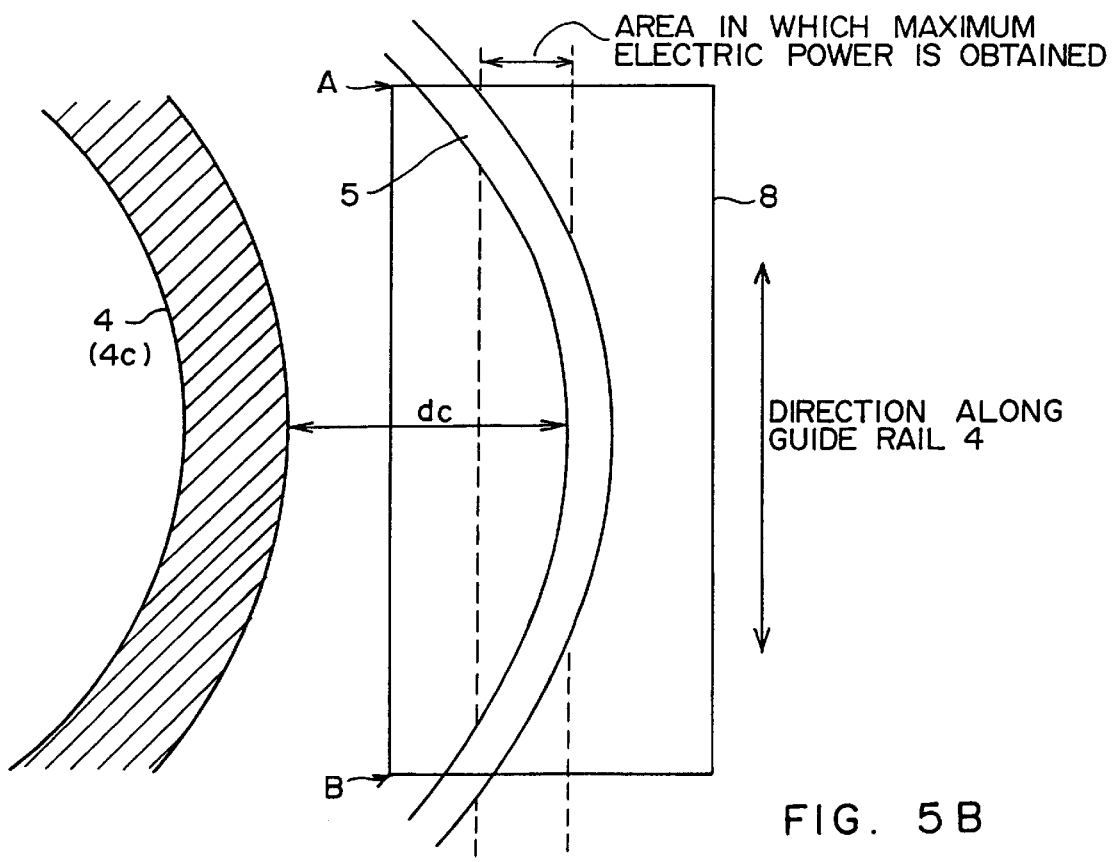

For example, when the electric power receiving unit 2 is positioned outside the curve of the curved guide rail 4 (as shown in FIG. 4), the distance dc between the feeder 5 and the guide rail 4 is larger than the distance d between the feeder 5 and the guide rail 4 at the straight portion 4a. Thus, as shown in FIGS. 5A and 5B, the outbound portion and the inbound portion of the feeder 5 reach deeper positions of the two recessed portions (feeder housing portions) of the E-shaped magnetic material core 8 than the structure according to the conventional system shown in FIG. 3B. Thus, as shown in FIG. 5B, the relative position between the feeder 5 and the E-shaped magnetic material core 8 is not always optimum at the center portion of the E-shaped magnetic material core 8 in the direction along the guide rail 4. However, the average position (between points A and B) of the feeder 5 housed in the E-shaped magnetic material core 8 becomes a nearly optimum position. In contrast, when the electric power receiving unit 2 is positioned inside the curve of the curved portion 4c the distance dc between the feeder 5 and the guide rail 4 is smaller than the distance d between the feeder 5 and the guide rail 4 at the straight portion 4a of the guide rail 4.

Thus, when electric power is supplied from the feeder 5 to the electric power receiving unit 2 by electromagnetic induction, the leakage flux is decreased and thereby the electric power supplying efficiency is improved.

It should be noted that a U-shaped magnetic material core, an E-shaped Sendust core, a U-shaped Sendust core, or another magnetic material and shape can be used instead of the E-shaped magnetic material core 8.

Figures 6A, 6B:
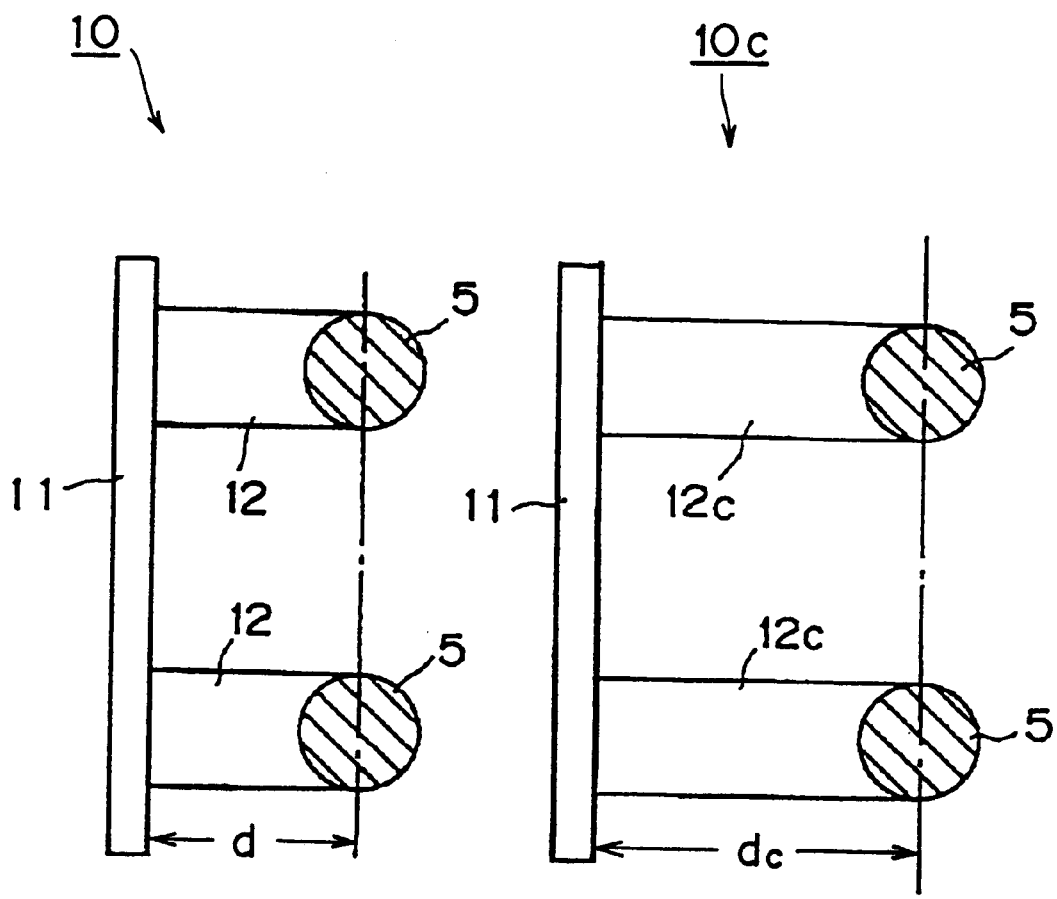
FIG. 6A is a sectional view showing support members disposed in a straight portion of a rail.
FIG. 6B is a sectional view showing support members disposed in a curved portion of a rail.

FIGS. 6A and 6B are sectional views showing support members used at the straight portion and the curved portion of the guide rail 4. The support member 10 disposed at the straight portion 4a and the support member 10c disposed at the curved portion 4c each comprise a base plate 11. Cylindrical or polygonal supports (pillars) 12 and 12c are disposed perpendicularly or nearly perpendicularly to the base plate 11. The support 12 is formed so that the distance d is maintained. Likewise, the support 12c is formed so that the distance dc is maintained. In other words, a plurality of lengths of supports 12c are used for the support members 10c when necessary.

The outer end portions of the supports 12 and 12c are formed corresponding to the diameters of the outbound portion and the inbound portion of the feeder 5. The outbound portion and the inbound portion of the feeder 5 are engaged with the outer end portions of the supports 12 and 12c and secured. The base plate 11 has mounting holes. Through the mounting holes, the base plate 11 is mounted to the guide rail 4 with bolts or the like.

By supporting the outbound portion and the inbound portion of the feeder 5 with a proper combination of the support members 10 and 10c, as shown in FIG. 4, when the electric power receiving unit 2 travels from the straight portion 4a to the curved portion 4c of the guide rail 4, the distance between the guide rail 4 and the feeder 5 is gradually increased. In contrast, when the electric power receiving unit 2 travels from the curved portion 4c to the straight portion 4a of the guide rail 4, the distance between the guide rail 4 and the feeder 5 is gradually decreased.

Figure 7A:
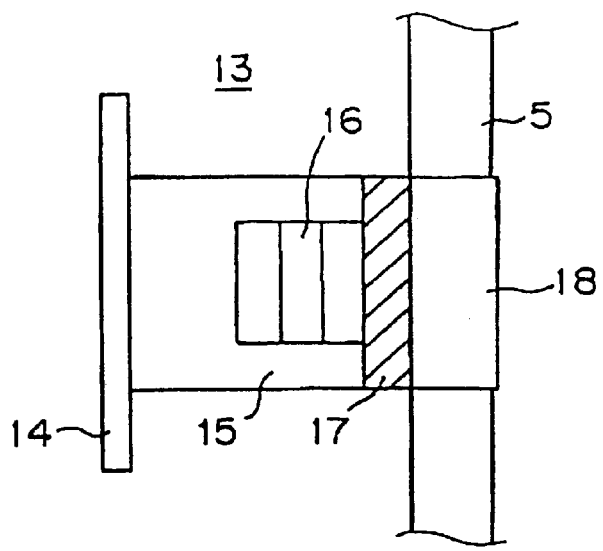
FIG. 7A is a top view showing another example of a support member of the feeder.
Figure 7B:
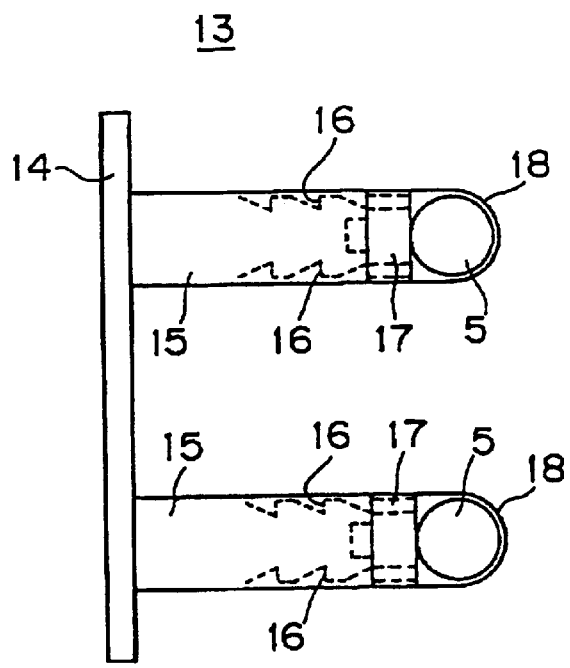
FIG. 7B is a sectional view showing a nearly-center portion of the support member shown in FIG. 7A.
Figure 7C:
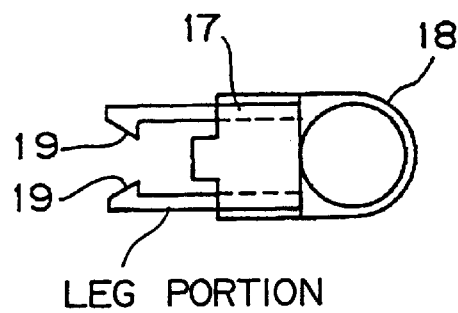
FIG. 7C is an enlarged sectional view showing a spacer and a feeder holding member of the support members shown in FIGS. 7A and 7B.

FIG. 7A is a top view showing another example of the structure of a support member that supports the feeder. FIG. 7B is a sectional view showing a nearly-center portion of the support member shown in FIG. 7A. FIG. 7C is an enlarged sectional view showing a spacer and a feeder holding member of each of the support members shown in FIGS. 7A and 7B.

In FIGS. 7A to 7C, the support member 13 has a base plate 14 and supports 15 secured thereto. A side wall of each of the supports 15 has staged-grooves 16. In the example shown in FIG. 7B, three staged-grooves are formed. A spacer 17 and a feeder holding member 18 are disposed at the top of the support 15. The feeder holding member 18 is made of, for example, a resilient plastic material. At leg portions of the feeder holding member 18, respective hooks 19 that fit into the staged-grooves 16 formed on the side walls of the support 15 are formed.

When the feeder holding member 18 is mounted to the support 15, the support 15 is gripped by the leg portions of the feeder holding member 18. At this point, as shown in FIG. 7C, a spacer 17 of a predetermined length is engaged with the leg portions of the feeder holding member 18. Thus, hooks 19 formed at the leg portions of the feeder holding member 18 are engaged with the staged-grooves 16 on the side walls of the support 15. Thus, the feeder holding member 18 is secured to the support 15. The engaged positions of the hooks 19 in the three-staged grooves depend on the length of the spacer 17. In other words, the distance from the base plate 14 to the outer edge portion of the feeder holding member 18 that holds the feeder 5 depends on the length of the spacer. Thus, when the length of the spacer is varied, the distance between the guide rail 4 and the feeder 5 can be adjusted.

In the example shown in FIG. 4, when the support member 13 is disposed at the straight portion 4a of the guide rail 4, a relatively long spacer is used so that the hooks 19 are engaged with the center staged-grooves. In contrast, when the support member 13 is disposed at the curved portion 4c of the guide rail 4, a short spacer is used so that the hooks 19 are engaged with the outer staged-grooves.

Thus, according to the structure shown in FIGS. 7A, 7B, and 7C, without need to provide a plurality of lengths of support members, by changing spacers, the distance between the feeder and the guide rail can be adjusted. Thus, parts can be commonly used.

Figure 8:
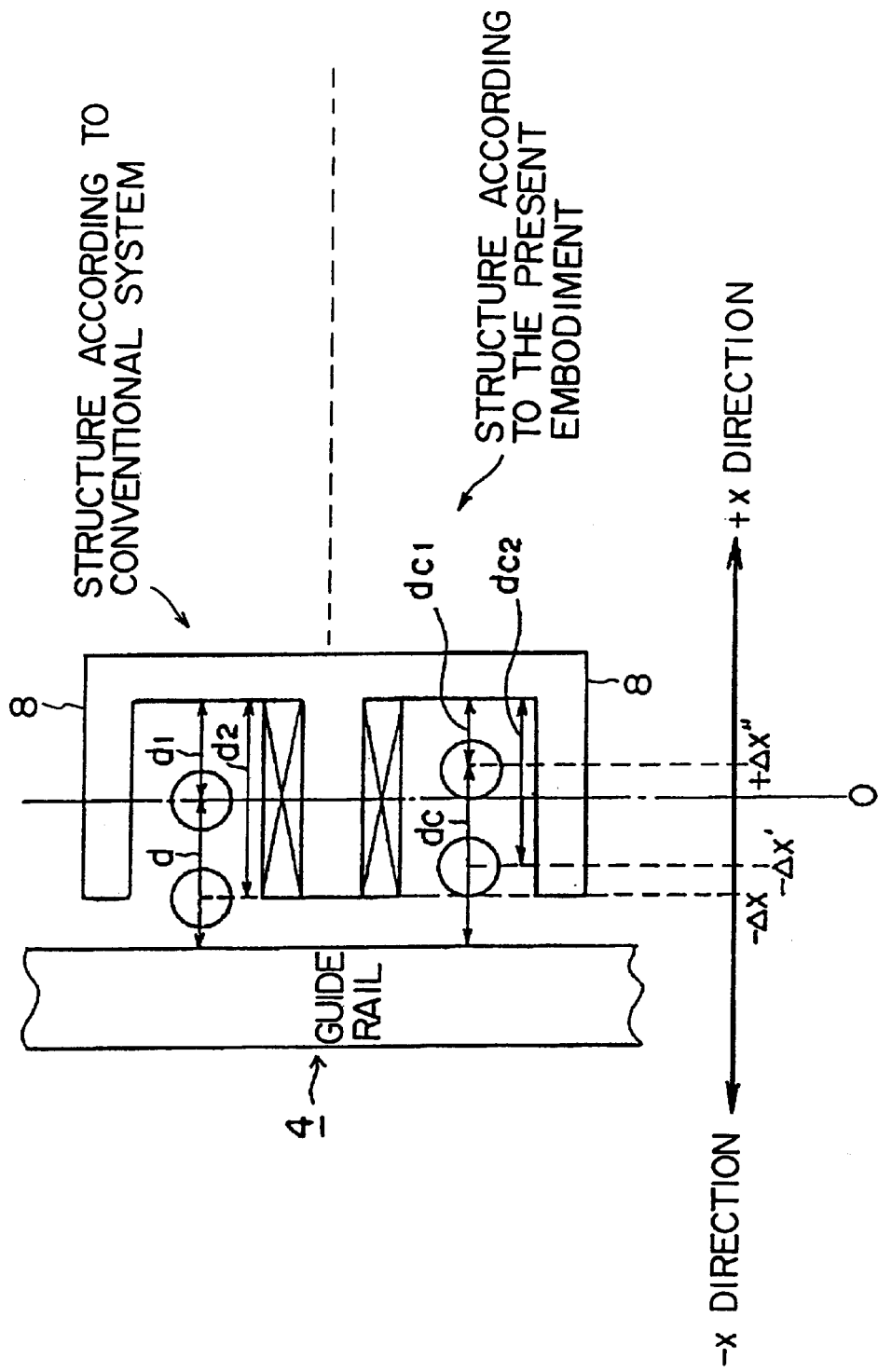
FIG. 8 is a partial sectional view for explaining the relation between the position of a feeder and a ferrite core space portion at a curved portion of the rail in the system according to the present invention and in the system according to the related art reference.

FIG. 8 is a partial sectional view showing the relation between the relative positions of the feeder and the magnetic material core of the electric power receiving unit at the curved portion of the guide rail in the system according to the present invention and that according to the related art reference.

As shown in the upper portion of FIG. 8, in the non-contact type electric power supplying system according to the conventional structure, at the center portion in the vehicle-traveling direction of the E-shaped magnetic material core 8 (the direction perpendicular to the plane of drawing of FIG. 8), the feeder 5 is positioned at the center portion in the depth direction of the feeder housing portion of the E-shaped magnetic material core 8, the feeder 5 being positioned a distance d away from the guide rail 4, the distance between the feeder 5 and the internal wall surface of the E-shaped magnetic material core 8 being d1. In contrast, at an edge portion in the vehicle-traveling direction of the E-shaped magnetic material core 8, the feeder 5 is positioned a distance d2 away from the internal wall surface of the E-shaped magnetic material core 8. Thus, in the non-contact type electric power supplying system according to the conventional structure, when the electric power receiving unit 2 is positioned at the curved portion 4c of the guide rail 4 (in this case, the electric power receiving unit 2 is positioned outside the curve of the guide rail 4), the feeder 5 is only shallowly inserted into the feeder housing portion of the E-shaped magnetic material core 8.

In the non-contact type electric power supplying system according to the present invention, as shown in the lower portion of FIG. 8, at the center portion in the vehicle-traveling direction of the E-shaped magnetic material core 8, the feeder 5 is positioned a distance dc away from the guide rail 4. In other words, the feeder 5 is positioned closer to the internal wall surface of the E-shaped magnetic material core 8 than that of the conventional structure. The distance between the feeder 5 and the internal wall surface of the E-shaped magnetic material core 8 is dc1. On the other hand, at an edge portion in the vehicle-traveling direction of the E-shaped magnetic material core 8, the feeder 5 is positioned a distance dc2 away from the internal wall surface of the E-shaped magnetic material core 8. Thus, according to the non-contact type electric power supplying system according to the present invention, when the electric power receiving unit 2 is positioned at the curved portion 4c of the guide rail 4 (in this case, the electric power receiving unit 2 is positioned outside the curve of the guide rail 4), the feeder 5 is deeply inserted into the feeder housing portion of the E-shaped magnetic material core 8. In other words, in the system according to the present invention, assuming that the position of the feeder 5 in the case that the vehicle 3 is positioned on the straight portion 4a of the guide rail 4 is a reference position, when the vehicle 3 is positioned on the curved portion 4c of the guide rail 4, the feeder 5 is placed at a position displaced by +Δx" from the reference position. Further, at an end portion in the vehicle-traveling direction of the E-shaped magnetic material core 8, the position of the feeder 5 is displaced by −Δx' from the reference position. Thus, the displacement −Δx' according to the present invention is smaller than the displacement −Δx of the system according to the conventional structure. Experimental results show that when the feeder 5 is displaced inwardly to the internal wall surface (in the +x direction) from the reference position in the case that the vehicle 8 is positioned outside the curved guide rail 4, the output power of the electric power receiving unit 2 increases and that when the feeder 5 is displaced outwardly from the internal wall surface (in the −x direction) from the reference position, the output power of the electric power receiving unit 2 decreases. As a reason for this, it is supposed that the interlinked magnetic flux passing through the coil 9 of the electric power receiving unit 2 varies.

Figure 9B:
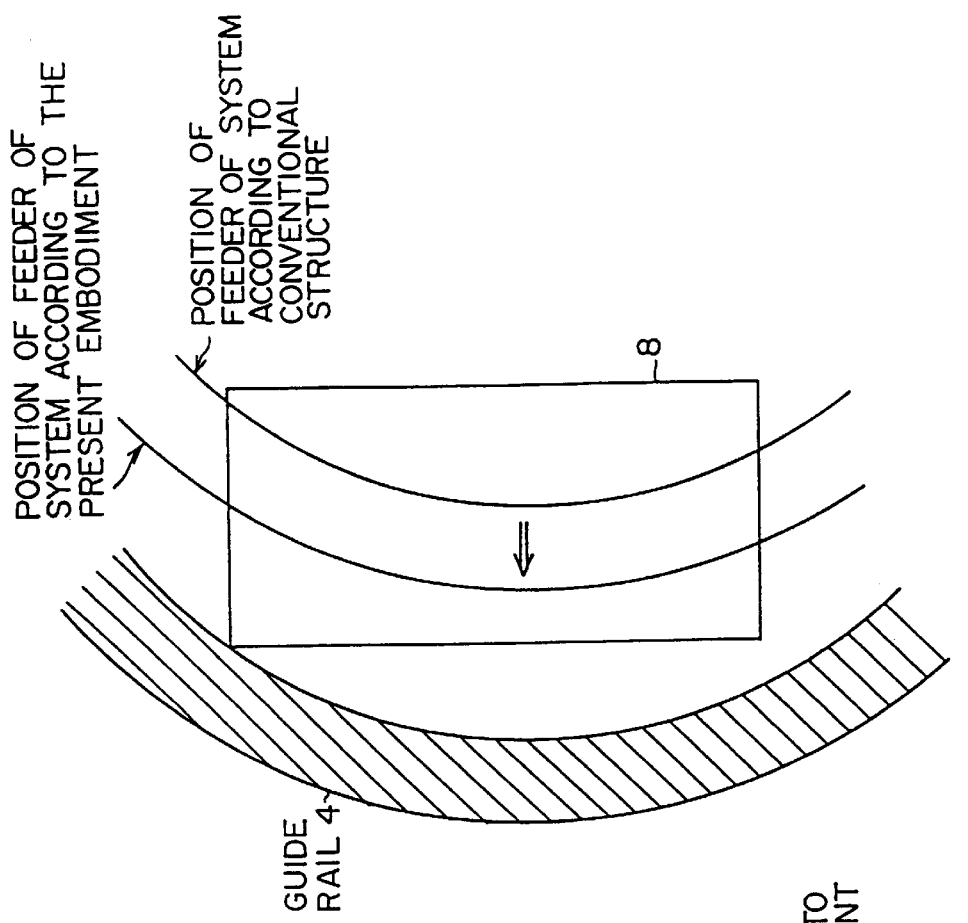
FIGS. 9A and 9B are schematic diagrams showing the difference between the position of the feeder in the system according to the related art reference and the position of the feeder in the system according to the present invention.
Figure 9A:
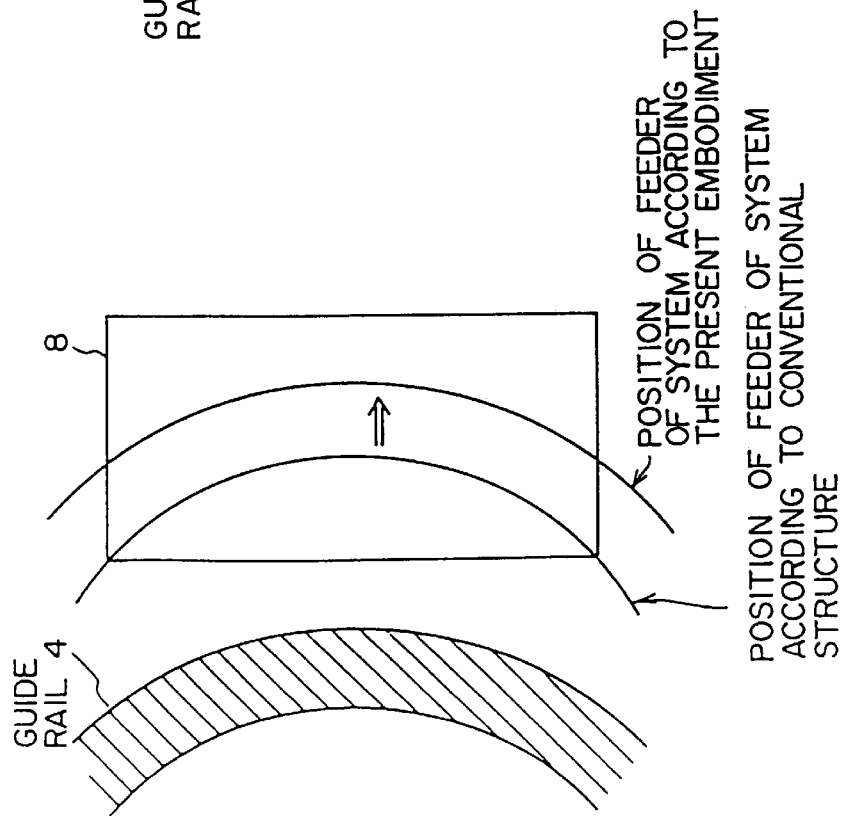

FIGS. 9A and 9B show the difference between the system according to the conventional structure and the system according to the present embodiment of the present invention. At a curved portion in which the E-shaped magnetic material core 8 of the electric power receiving unit 2 is outside the curve of the curved portion of the rail 4 as shown in FIG. 9A, the distance between the guide rail 4 and the feeder 5 of the system according to the present embodiment is larger than that of the system according to the conventional structure. This situation takes place when the vehicle 3 travels outside the curve of a curved portion of the guide rail 4. In contrast, at a curved portion in which the E-shaped magnetic material core 8 of the electric power receiving unit 2 is inside the curve of the curved portion of the rail 4 as shown in FIG. 9, the distance between the guide rail 4 and the feeder 5 of the system according to the present embodiment is smaller than the system according to the conventional structure. This situation takes place when the vehicle 3 travels inside the curve of a curved portion of the guide rail 4.

Figure 10A:
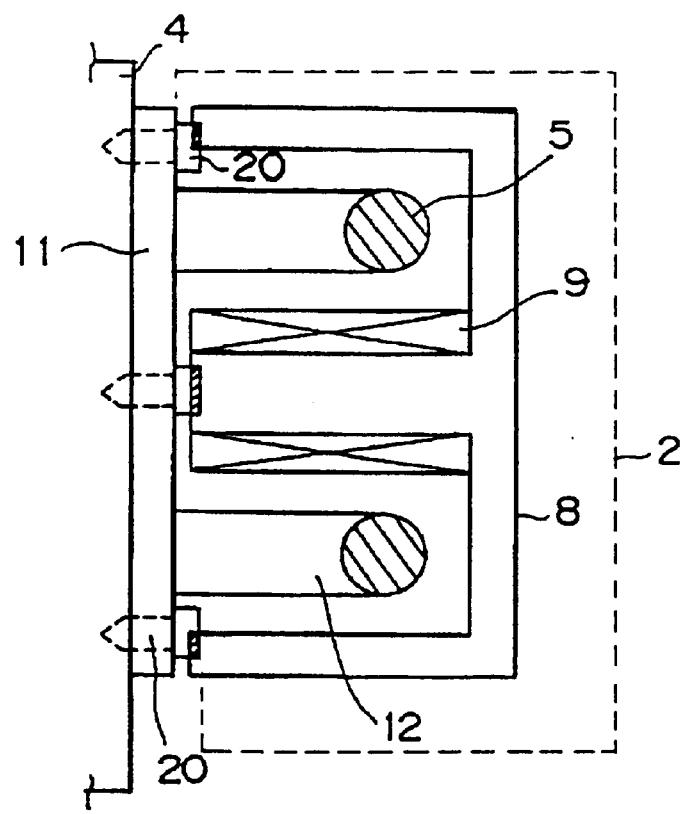
FIG. 10A is a partial sectional view for explaining the structure for mounting a support member of the feeder to the rail according to the related art reference.

FIG. 10A is a partial sectional view for explaining a securing means for mounting a support member of a feeder to a guide rail according to the conventional structure. As shown in FIG. 10A, a support member 10 composed of a base plate 11 and supports 12 is secured to a guide rail 4 with securing screws 20. At this point, so as to easily mount and dismount the support member 10 to/from the guide rail 4, the securing screws 20 are disposed at an upper portion of the support member 10 (the upper side of the upper support 12), a lower position of the support member 10 (the lower side of the lower support 12), and a center portion of the support member 10 (between the upper and lower supports 12).

Figure 10B:
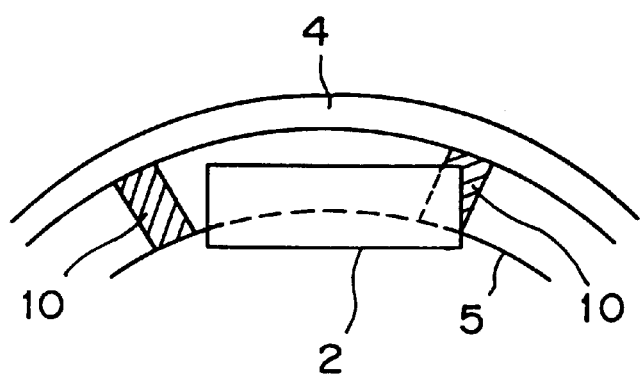
FIG. 10B is a schematic diagram for explaining a problem on the structure shown in FIG. 10A.

However, the securing screws 20 at these positions inevitably approach edge portions of the E-shaped magnetic material core 8 of the electric power receiving unit 2. Thus, as shown in FIG. 10B, when the electric power receiving unit 2 is positioned inside the curve of a curved portion of the guide rail 4, the distance between the head portions of the securing screws 20 and the edge portions of the E-shaped magnetic material core 8 becomes small. Occasionally, they may contact, thus damaging the E-shaped magnetic material core 8.

Figure 11A:
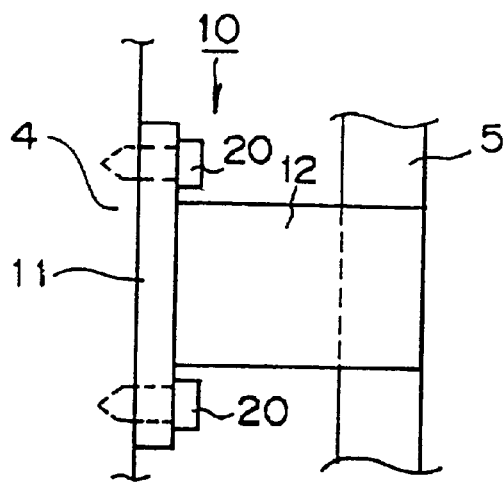
FIG. 11A is a top view showing a securing means for preventing a core member from contacting securing screws.
Figure 11B:
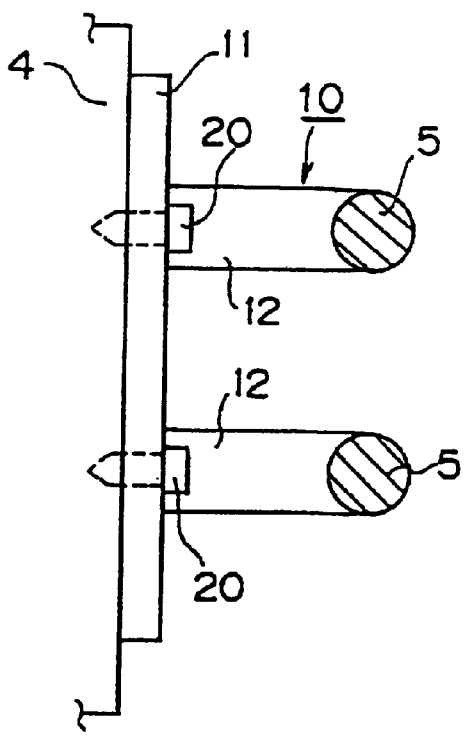
FIG. 11B is a sectional view showing the securing screws shown in FIG. 11A.
Figure 11C:
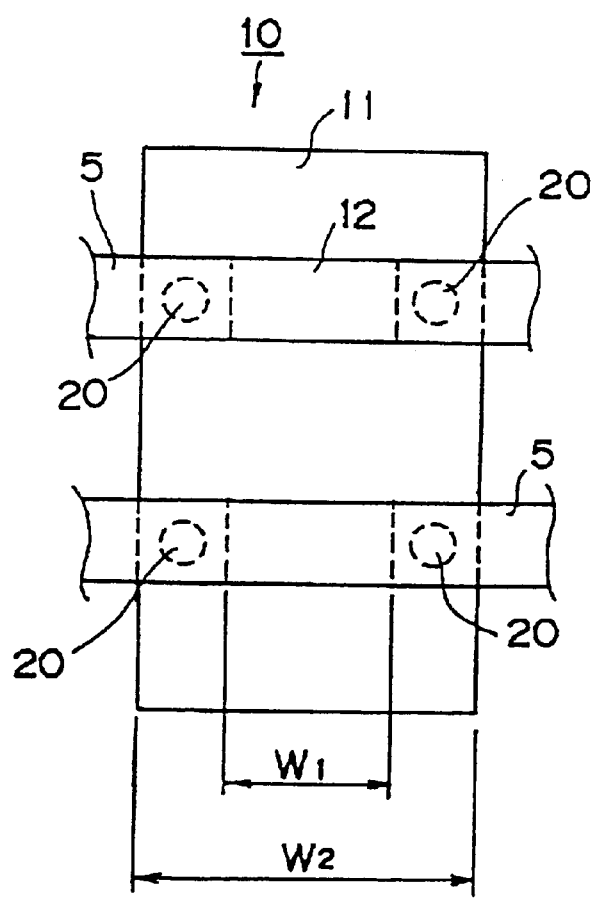
FIG. 11C is a plan view showing the securing screws shown in FIG. 11C.

FIGS. 11A to 11C are schematic diagrams showing the structure of a securing method for preventing the core member of the electric power receiving unit 2 from contacting the securing screws. FIG. 11A is a top view of the structure. FIG. 11B is a sectional view of the structure. FIG. 11C is a plan view of the structure.

In the structure according to the embodiment, as shown in FIGS. 11B and 11C, a support member 10 protrudes perpendicular to the base plate 11. The securing screws 20 that secure the base plate 11 and the support member 10 to the guide rail 4 lie substantially along a line formed by a perpendicular projection of the feeder 5 onto the base plate 11. The securing screws 20 are disposed at two positions on both sides of each of the supports 12. In the system according to the embodiment, the outbound portion and the inbound portion of the feeder 5 are housed in two recessed portions of the E-shaped magnetic material core 8. In other words, the securing screws 20 are disposed so that they are opposite to the respective recessed portions (feeder housing portions) of the E type ferrite 8. Thus, the securing screws 20 are not present at the positions corresponding to the three end portions of the E-shaped magnetic material core 8. Consequently, even if the electric power receiving unit 2 approaches the guide rail 4, the E-shaped magnetic material core 8 does not contact the securing screws 20.

As shown in FIG. 11C, the width W1 of the supports 12 that protrude from the base plate 11 of the support member 10 is narrower than the width W2 of the base plate 11. Screw holes for the securing screws 20 are formed in the base plates 11 on both sides of each of the supports 12.

As described above, according to the present invention, since the distance between the guide rail and the feeder in a straight portion of the guide rail is different from the distance between them in a curved portion of the guide rail, the electric power received by the electric power receiving unit can be suppressed from decreasing. In addition, the vehicle can travel stably.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A non-contact type electric power supplying system, having a feeder disposed along a rail that guides an electrically powered vehicle, for supplying electric power from the feeder to the electrically powered vehicle on a non-contact basis, wherein the distance between a curved portion of the rail and the feeder is different from the distance between a straight portion of the rail and the feeder.

2. The non-contact type electric power supplying system as set forth in claim 1, wherein the electrically powered vehicle has an electric power receiving unit that receives electric power from the feeder on a non-contact basis, and wherein the distance between the rail and the feeder is designated so that when an AC current is supplied to the feeder, electromotive force generated at the electric power receiving unit becomes a maximum.

3. The non-contact type electric power supplying system as set forth in claim 1, wherein the feeder is disposed with support members that protrude perpendicularly or almost perpendicularly to the rail, and wherein the length of the support members at a curved portion of the rail is different from the length of the support member at a straight portion of the rail.

4. The non-contact type electric power supplying system as set forth in claim 1, wherein the electrically powered vehicle has an electric power receiving unit that receives electric power from the feeder on a non-contact basis, and wherein the distance between the rail and the feeder at a curved portion of the rail at which the electric power receiving unit is outside the curve of the curved portion of the rail is larger than the distance between the rail and the feeder at a straight portion of the rail.

5. The non-contact type electric power supplying system as set forth in claim 1, wherein the electrically powered vehicle has an electric power receiving unit that receives electric power from the feeder on a non-contact basis, and wherein the distance between the rail and the feeder at a curved portion of the rail at which the electric power receiving unit is inside the curve of the curved portion of the rail is smaller than the distance between the rail and the feeder at a straight portion of the rail.

6. A support member for supporting a feeder of a non-contact type electric power supplying system, the feeder being disposed along a rail that guides an electrically powered vehicle, the system supplying electric power from the feeder to the electrically powered vehicle on a non-contact basis, the support member comprising:

a body portion disposed on the rail and having a plurality of staged-grooves;

a feeder holding portion for holding the feeder, said feeder holding portion having a plurality of legs for gripping said body portion, each of the legs having a hook for engaging with one of the staged-grooves; and a spacer for determining the engaged position of each of the hooks with one of the staged-grooves so as to engage said feeder holding portion with said body portion.

7. A non-contact type electric power supplying system comprising:

a rail for guiding an electrically powered vehicle;

a feeder disposed along the rail for supplying electric power to the vehicle on a con-contact basis;

a base plate secured to the rail; and a support protruding substantially perpendicular to the base plate, the support having an end portion supporting the feeder;

wherein the base plate is secured to the rail substantially along a line formed by a substantially perpendicular projection of the feeder on to the base plate.

8. The system of claim 7, further comprising at least one screw for securing the base plate to the rail, the at least one screw being positioned substantially along the line.

9. The system of claim 8, further comprising a pair of screws for securing the base plate to the rail, each one of the pair of screws being on opposite sides of the support and positioned substantially along the line.

10. The system of claim 7, wherein the feeder comprises first and second feeder portions supported by first and second supports, respectively, the base plate being secured to the rail substantially along first and second lines formed by substantially perpendicular projections of the first and second feeder portions on to the base plate, respectively.

11. The system of claim 10, further comprising first and second pairs of screws for securing the base plate to the rail, the first pair of screws being positioned substantially along the first line, on opposite sides of the first support, and the second pair of screws being positioned substantially along the second line, on opposite sides of the second support.

12. A non-contact type electric power supplying system comprising:

a rail for guiding an electrically powered vehicle;

a feeder disposed along the rail for supplying electric power to the vehicle on a non-contact basis, the vehicle including a core having at least one recessed portion for receiving the feeder;

a base plate secured to the rail;

a support protruding substantially perpendicular to the base plate, the support having an end portion supporting the feeder; and at least one screw for securing the base plate to the rail;

wherein the base plate is secured to the rail within a region opposite to the at least one recessed portion when the feeder is received within the recessed portion, and wherein the at least one screw is positioned within the region.

13. The system of claim 12, further comprising two screws for securing the base plate to the rail, the two screws being positioned within the region, on opposite sides of the support along the direction of the feeder.

14. A non-contact type electric power supplying system comprising:

a rail for guiding an electrically powered vehicle;

a feeder disposed along the rail for supplying electric power to the vehicle on a non-contact basis, the vehicle including a core having at least one recessed portion for receiving the feeder;

a base plate secured to the rail;

a support protruding substantially perpendicular to the base plate the support having an end portion supporting the feeder; and first, second, third and fourth screws for securing the base plate to the rail;

wherein the base plate is secured to the rail within a region opposite to the at least one recessed portion when the feeder is received within the recessed portion, and wherein the core includes first and second recessed portions for receiving first and second portions of the feeder, the base plate having first and second supports for supporting the first and second portions of the feeder, respectively, the base plate being secured to the rail within the first and second regions of the base plate which are opposite to the first and second recessed portions, respectively, when the first and second portions of the feeder are received within the first and second recessed portions, respectively, and wherein the first and second screws are positioned within the first region, on opposite sides of the support along the direction of the first portion of the feeder, the third and fourth screws are positioned within the second region, on opposite sides of the support along the direction of the second portion of the feeder.

* * * * *